United States Patent [19]

Duffy

[11] Patent Number: 4,504,654

[45] Date of Patent: Mar. 12, 1985

[54] POLYMER RECOVERY

[75] Inventor: John P. Duffy, Sarnia, Canada

[73] Assignee: Polysar Limited, Sarnia, Canada

[21] Appl. No.: 418,629

[22] Filed: Sep. 16, 1982

[30] Foreign Application Priority Data

Nov. 26, 1981 [CA] Canada ................................... 390978

[51] Int. Cl.³ .............................................. C08F 6/10
[52] U.S. Cl. .................................... 528/499; 528/500
[58] Field of Search ............................... 528/499, 500

[56] References Cited

U.S. PATENT DOCUMENTS

| | | | |
|---|---|---|---|
| 3,462,347 | 4/1969 | Chapman | 528/500 |
| 3,590,026 | 6/1971 | Carlson | 528/500 |
| 3,772,262 | 11/1973 | Clement | 528/500 |
| 4,347,098 | 8/1982 | Hubby | 528/500 |
| 4,391,972 | 7/1983 | Kaiser | 528/499 |

Primary Examiner—Christopher A. Henderson
Attorney, Agent, or Firm—Stevens, Davis, Miller & Mosher

[57] ABSTRACT

An improved process is provided for the recovery of a polymer from a solution thereof in an organic solvent by contact with steam and water wherein economics in the use of energy are achieved by controlling the contact of said solution with steam and water to provide a predetermined amount of residual solvent in the polymer, said contact being under conditions of controlled temperature and pressure. Such a process may be used for the recovery, for example, of polybutadiene from a solution in a benzene-butene-1 mixture.

6 Claims, 2 Drawing Figures

POLYMER RECOVERY

This invention is directed to an improved process for the recovery of a polymer from a solution thereof in an organic solvent by contact with steam and water.

Synthetic polymers are commonly produced by polymerization, in the presence of a suitable catalyst, of the monomer or monomers dissolved in a solvent to produce a solution of the polymer in the solvent. Any unreacted monomer or monomers will also be present in the solution of the polymer. Polymers may also be produced by chemical reaction of an initial polymer in solution with suitable reactants. In order to recover the polymer free of residual monomer or monomers and free of solvent, it is common in the art to contact the polymer solution with steam and hot water so as to vaporize the solvent and residual monomer or monomers and to form a slurry of polymer particles in water, which slurry is then processed so as to separate the polymer from the water and the separated polymer is then subjected to a drying process.

Such recovery processes may utilize one or more vessels for the separation from the polymer of the solvent and residual monomer or monomers, usually a first vessel being a coagulation vessel and a second vessel or vessels being a stripping vessel. When the polymer is a thermoplastic material the operating temperature is usually set so as not to cause the melting of the polymer. When the polymer is elastomeric the operating temperature is usually set so as to cause removal of sufficient solvent in a coagulation vessel to avoid agglomeration of the polymer particles and the final small amount of solvent is removed in a stripping vessel. It is to be noted that agglomeration of elastomeric polymer particles can readily occur if there is above about 10 percent of solvent in the polymer because the particles will by very sticky. For recovery of elastomeric polymers the pressure in the coagulation vessel is normally set by virtue of the equipment and removal of solvent is controlled by control of the temperature in the coagulation vessel. The pressure in the stripping vessel may be higher than that in the coagulation vessel, as in Canadian Pat. No. 685,343, or may be lower than in the coagulation vessel, as in British Pat. No. 1,284,045, or may be the same as in the coagulation vessel, as in U.S. Pat. No. 3,287,301.

It is an objective of the present invention to provide an improved process for the recovery of an elastomeric polymer from a solution thereof in an organic solvent by contact with steam and water whereby the use of steam is optimized.

In accordance with the invention there is provided an improved continuous process for the recovery of an elastomeric polymer from a solution thereof in organic solvent, said solution optionally also containing unreacted monomer, which process comprises contacting in a coagulation vessel operated at a pressure greater than atmospheric the solution of polymer, optionally containing mixed therewith water having a temperature of from about 40° to about 90° C., with water and steam to produce a first overhead stream of vaporized solvent and water and a first bottom stream of water and polymer particles containing residual solvent, passing said first overhead stream to a condensing means for condensing said vaporized solvent and water to the liquid phase, passing said first bottom stream to at least one but not more than three stripping vessels in series, said stripping vessels being maintained at a lower pressure than in said coagulation vessel but above atmospheric pressure, optionally adding a further supply of steam to any one or more of said stripping vessels, to produce a second overhead stream of vaporized solvent and water and a second bottom stream of polymer particles in water, passing said second overhead stream of vaporized solvent and water to a condensing means for condensing said vaporized solvent and water to the liquid phase, passing said second bottom stream of polymer particles in water to separating means and separating said polymer particles from the water and drying said separated polymer particles, the improvement being that the temperature and pressure in said coagulation vessel are inter-relatedly varied such that the first overhead vapor stream from said coagulation vessel contains not more than about 50 mole percent of said organic solvent and that the polymer particles in water of the first bottom stream contain a predetermined amount of residual solvent which is greater than about 3 but not greater than about 8 percent by weight based on polymer plus solvent.

An essential advantage of the present invention is a reduction and, at the optimum, a minimization of the energy, in the form of steam, which is used in the recovery of the polymer in comparison with the processes of the prior art. This advantage is achieved in the present process by the inter-related variation of the temperature and pressure in the coagulation vessel such that the first overhead vapor stream from the coagulation vessel contains not more than about 50 mole percent of organic solvent and that the polymer particles in water from the coagulation vessel contain a predetermined amount of residual solvent which is greater than about 3 but not greater than about 8 percent by weight based on polymer plus solvent.

One of the major disadvantages of the prior art wherein the temperature and pressure in the coagulation vessel are not inter-relatedly varied has been that, by operating at a high initial temperature and by controlling only the temperature in the coagulation vessel, the temperature in the coagulation vessel would be maintained constant by a reduction in the steam flow rate to the coagulation vessel in response to temperature increases that would otherwise occur caused by increases in pressure such as are caused by flow variations, fouling of protective screens in the vapor lines, etc. However, such a reduction in steam flow rate would, in turn, lead to a reduction in the amount of solvent removed from the polymer which would lead to the polymer particles in water in the coagulation vessel becoming more sticky and ultimately undergoing excessive agglomeration. Excessive agglomeration of the polymer particles could ultimately lead to plugging up of the coagulation vessel. Because of these problems, it was customary to operate the process at a high temperature, i.e. high steam usage, to remove a very large proportion of the solvent in the coagulation vessel and thereby to minimize excessive agglomeration of the polymer particles. When the temperature and pressure are inter-relatedly varied to control the amount of residual solvent in the polymer particles, as in the present invention, the possibility of having excessive agglomeration of the polymer particles is significantly reduced and the usage of steam (i.e. energy) is reduced.

Thus it is apparent that in the process of the present invention, inter-related variation of the temperature and pressure in the coagulation vessel is relatable to a parameter concerning the amount of residual solvent remaining in the polymer particles in water in the coagulation vessel because this has an effect on the extent of agglomeration of the polymer particles in the coagulation vessel.

In the present invention, the parameter relatable to the amount of residual solvent remaining in the polymer particles in water in the coagulation vessel is introduced into the inter-related variation of the temperature and pressure in the coagulation vessel. Further, the present process is more particularly defined by describing an upper limit to the mole percent of solvent in the first overhead vapor stream from said coagulation vessel. Over the temperature and pressure ranges preferably used in the process of this invention, a reduced form of a mathematical relationship between the temperature, the pressure and the amount of solvent remaining in the polymer particles of the first bottom stream may take the form $$T = C_1(P) + C_2(X) + C_3$$

where T is the temperature in °C. in the coagulation vessel, P is the absolute pressure in kg/cm² in the coagulation vessel and X is the weight percent of solvent remaining in the polymer particles of the first bottom stream, $C_1$, $C_2$ and $C_3$ being empirical constants for the process.

In the present invention, the process is operated such that, for the first bottom stream from the coagulation vessel, the polymer particles therein contain a predetermined amount of residual solvent which is greater than about 3, preferably greater than about 4, but not greater than about 8, preferably not greater than about 6, percent by weight based on polymer plus solvent. In a preferred embodiment of the invention, the coagulation vessel is operated at a temperature of from about 105°, most preferably from about 110°, to about 125° C. and at a pressure of from about 2.1 to about 3.5 kg/cm² absolute. The stripping vessel or vessels are operated at lower temperature and pressure than the coagulation vessel but above about 100° C. and above about 1 kg/cm² absolute but below the pressure of the coagulation vessel. When more than one stripping vessel is used, they may be operated at essentially similar conditions of temperature and pressure but most preferably the temperature and pressure would be lower for the stripping vessel furthest removed from the coagulator than for the stripping vessel closest to the coagulator. Steam optionally may be supplied to the stripping vessel or vessels or may be supplied to only some of the stripping vessels when there are two or three such vessels in series.

For optimal operation of the process of the invention, that is for the least usage of energy especially in the form of steam, it is desirable to operate at a temperature and a pressure which are as low as possible in the coagulation vessel concomitant with not incurring excessive agglomeration of the polymer particles therein. For such optimal operations, the condensing means for condensing to the liquid phase the first overhead vapor steam is operated at a maximum capacity with the coolant supplied to the condensing means being at the lowest economical temperature.

BRIEF DESCRIPTION OF DRAWINGS

Reference is now made to the figures which illustrate specific embodiments of the process of the present invention.

DETAILED DESCRIPTION OF DRAWINGS

Figure 1:
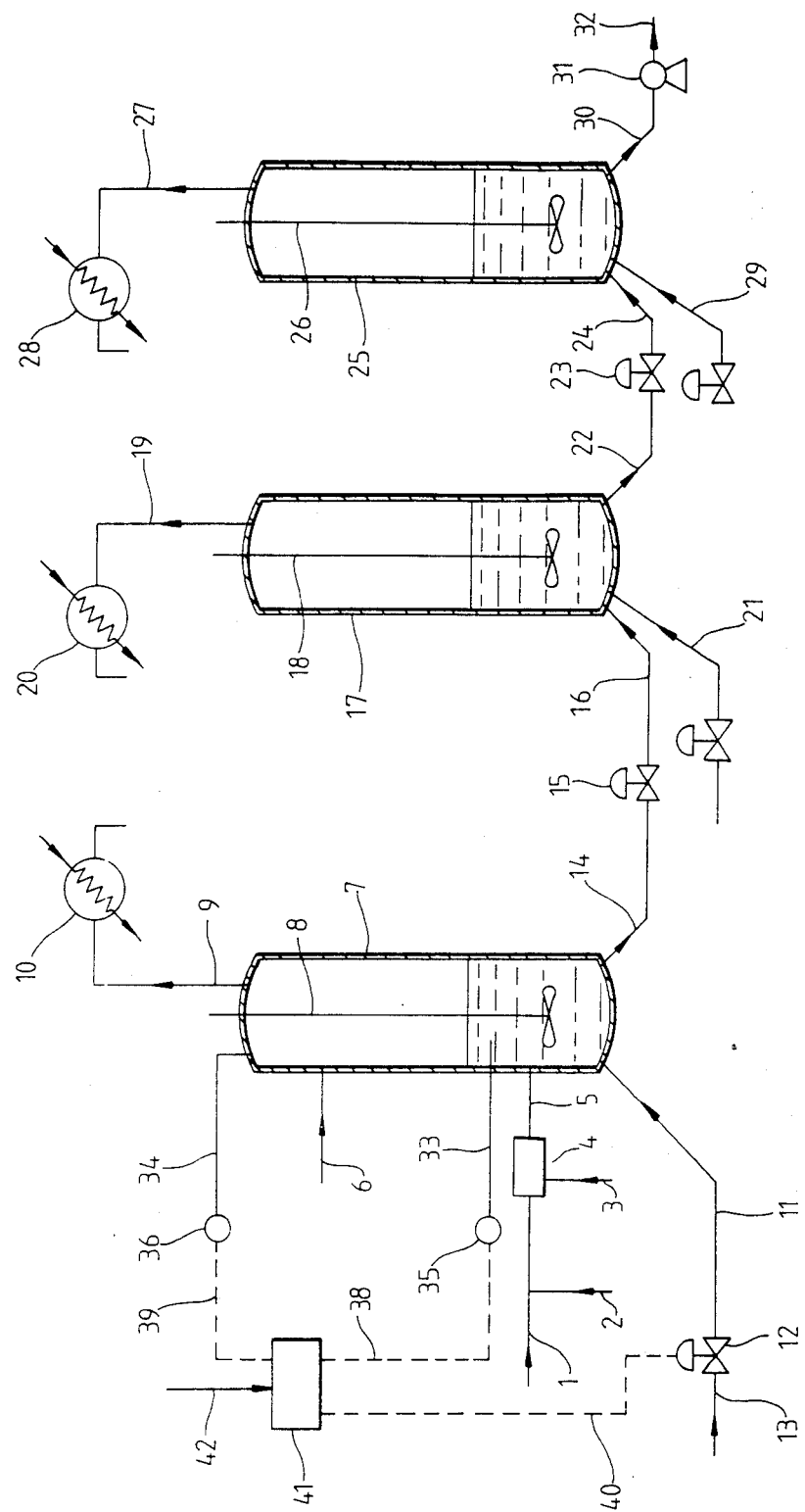
FIG. 1 is a schematic layout for a process for the recovery of a polymer.

In FIG. 1, the polymer solution enters at line 1, with water (if added) being introduced through line 2. The polymer solution enters an eductor 4 where it is mixed with steam from line 3 and then passes by line 5 to coagulation vessel 7. Water to maintain the required level in the coagulation vessel is added through line 6. The coagulation vessel 7 is equipped with an agitator 8, a vapor removal line 9, a steam entry line 11 and line 14 for removal of the polymer particles and water. The level of the contents in the coagulation vessel is maintained such as to permit good agitation of the water and polymer particles. The vapor removal line 9 is equipped with condenser 10 for cooling and condensing the vapor in line 9 into liquid. The flow of steam into line 11 is controlled by valve 12, as hereinafter described. The flow of polymer particles and water from line 14 is controlled by valve 15 into line 16 which supplies the polymer particles and water to stripper 17. The stripper 17 is equipped with an agitator 18 for mixing the contents and a vapor removal line 19. The vapor removal line 19 is equipped with condenser 20. Steam, when added, is controllably fed into stripper 17 by line 21. The polymer particles and water are removed from stripper 17 by line 22, the flow into line 24 being controlled by valve 23. The polymer particles and water in line 24 are fed to second stripper 25, which is equipped with agitator 26 and vapor removal line 27. The vapor removal line 27 is equipped with condenser 28. Steam, when added, is controllably fed into stripper 25 by line 29. The polymer particles and water are removed from stripper 25 by line 30 and forced by pump 31 into line 32 for subsequent separation, recovery and drying of the polymer (not shown) by means well known in the art such as a combination of a dewatering extruder and a drying extruder. Control of the operation of coagulation vessel 7 is by control means 41. The pressure in the coagulation vessel is measured in line 34 and recorded and transmitted by recorder-transmitter 36 by transmission line 39 to control means 41. The temperature of the contents of the coagulation vessel is measured by probe 33, recorded by recorder-transmitter 35 and transmitted to control means 41 by transmission line 38. External inputs to the control means are entered at 42, one such external input being the desired residual solvent content of the polymer particles in water in the coagulation vessel. Further such external inputs may include maximum and minimum values for the temperature and pressure in the coagulation vessel, such values being normal operational limits for the equipment. Control means 41 transmits the control data necessary, by transmission line 40, to control the operation of valve 12 so that the amount of steam from line 13 to the coagulation vessel is established to achieve temperature control.

Figure 2:
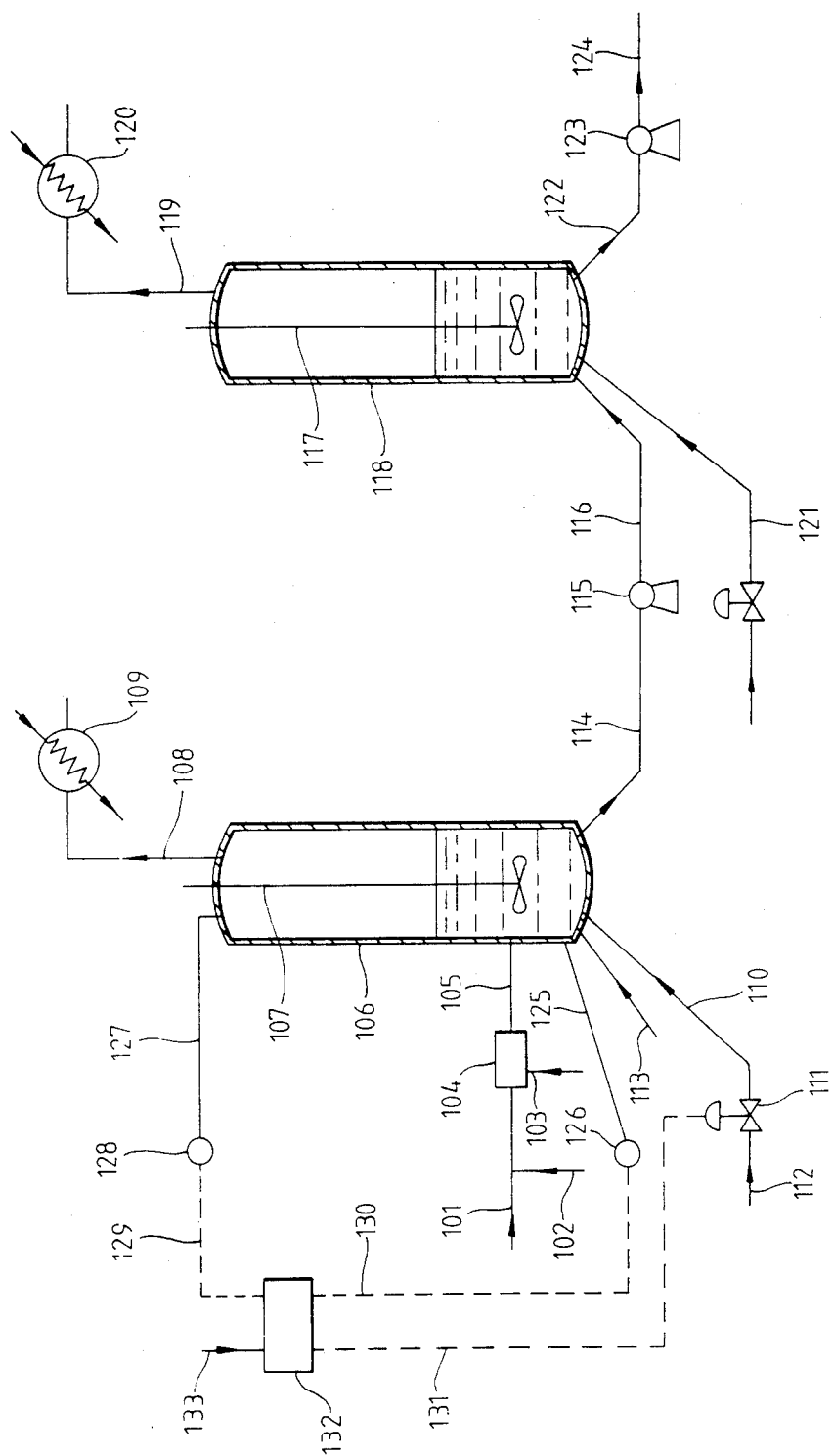
FIG. 2 is a schematic layout for a process for the recovery of a second polymer.

In FIG. 2, polymer solution enters at line 101, water may be introduced to the polymer solution through line 102, and the polymer solution is fed into eductor 104 where it is mixed with steam from line 103 and passed by line 105 into coagulation vessel 106. The coagulation vessel is equipped with an agitator 107 to mix the contents and with a vapor removal line 108. The vapor removal line is connected to condenser 109. Steam is controllably supplied to the coagulation vessel by line 110 and water may be introduced by line 113. The water and polymer particles are removed from the coagulation vessel by line 114 and fed by pump 115 through line 116 into stripper 117. The stripper is equipped with an agitator 118 to mix the contents and with a vapor removal line 119 which is equipped with a condenser 120. Steam is controllably supplied to the stripper by line 121. The water and polymer particles leave the stripper by line 122 and are forced by pump 123 into line 124 for subsequent separation, recovery and drying of the polymer (not shown). For the coagulation vessel 106, the pressure is measured in line 127 and recorded and transmitted by recorder-transmitter 128 to control means 132 by transmission line 129. The temperature of the contents of the coagulator is measured by temperature probe 125, recorded by recorder-transmitter 126 and transmitted to control means 132 by transmission line 130. External inputs, as hereinbefore described, may be entered into the control means at 133. Control means 132, by transmission line 131, controls the operation of valve 111 so that the amount of steam from line 112 being fed to the coagulation vessel is established to achieve temperature control.

The control means of FIG. 1 or of FIG. 2 may suitably by electronic or pneumatic. A desired calculated value for the amount of residual solvent remaining in the polymer particles in water in the coagulation vessel is entered by the manual input means. The control means would normally be equipped with upper and lower limit alarms for the temperature and pressure. In one embodiment, the pressure in the coagulation vessel is transmitted to a ratio relay or a multiplier component of the control means for automatic adjustment to a value usable by the other section of the control means. The adjusted value of the pressure and the desired calculated value for residual solvent in the polymer particles are added by the control means to provide a set point for the temperature. This set point is then compared with the actual temperature in the coagulation vessel and a signal will then be transmitted to the steam control valve to control the amount of steam entering the coagulation vessel. It may also be desirable to control the amount of steam entering the stripper or strippers—this may be achieved by use of a suitable control means which can concurrently or separately regulate the flow of steam to the coagulation vessel and the stripper or strippers.

Polymer solutions suitable for use in the process of the present invention include solutions of polymers of $C_4$–$C_6$ conjugated diolefins, copolymers of $C_4$–$C_6$ conjugated diolefins and vinyl or vinylidene substituted aromatic hydrocarbons, polymers of isobutylene, copolymers of isobutylene and $C_4$–$C_6$ conjugated diolefins, halogenated copolymers of isobutylene and $C_4$–$C_6$ conjugated diolefins, copolymers of ethylene and propylene and copolymers of ethylene, propylene and non-conjugated diolefins. Solvents suitable for use include the $C_4$ to $C_8$ aliphatic hydrocarbons, the $C_6$ to $C_8$ cycloaliphatic hydrocarbons, the $C_6$ to $C_8$ aromatic hydrocarbons and mixtures thereof. Residual monomers may also be present in the polymer solutions. Such polymer solutions may be obtained from the polymerization reaction vessel or may be obtained from a reaction vessel wherein a polymer has been chemically modified by reaction in solution. Examples of such polymer solutions include polybutadiene, styrene-butadiene polymer, or polyisoprene dissolved in one or more aliphatic, cycloaliphatic or aromatic hydrocarbons and may be produced by the solution polymerization of, respectively, butadiene, butadiene and styrene or of isoprene in the presence of an alkyl lithium catalyst or a transition metal compound—aluminum alkyl compound Ziegler-Natta catalyst. A suitable such polymer solution is, by way of example only, a polybutadiene in a mixture of butene-1 and benzene which also contains unreacted butadiene. Further examples of such polymer solutions include isobutylene-isoprene copolymers which have been treated in a solvent such as hexane with bromine or chlorine to yield the corresponding brominated or chlorinated isobutylene-isoprene copolymers. Still further examples of such polymer solutions include ethylene-propylene-dicyclopentadiene or ethylene-propylene-ethylidene norbornene polymers in hexane or heptane, which may also contain unreacted ethylene, propylene and dicyclopentadiene or ethylidene norbornene.

The following examples illustrate specific embodiments of the present invention and a comparative prior art process.

EXAMPLE 1

This example for the recovery of polybutadiene from a solution thereof was undertaken in the process layout of FIG. 1. The polymer solution, which entered the equipment by line 1, was produced by the polymerization of butadiene with a catalyst comprising a cobalt compound, an aluminum alkyl compound and water. The solution contained 11.5 weight percent of polybutadiene and 9.5 weight percent of unreacted butadiene and the solvent was a mixture of benzene and butene-1 in a ratio of about 2.95:1 by weight. For every 100 parts by weight per hour of polymer solution fed into line 1, 59 parts by weight per hour of water at a temperature of about 88° C. was added through line 2. About 39 parts by weight per hour of steam at about 10.5 kg/cm$^2$ and about 250° C. was added by line 3. About 59 parts by weight per hour of water at 88° C. was added to the coagulation vessel by line 6. The pressure in the coagulation vessel was 3.5 kg/cm$^2$ absolute and the temperature in the coagulation vessel was maintained at about 121.5° C. by the controlled addition of steam through line 11, the normal rate of addition being about 20 parts by weight per hour. The vapor removed from the coagulator by line 9 was removed at the rate of about 124 parts by weight per hour and polymer particles in water were removed from the coagulation vessel by line 14 at a rate of about 153 parts by weight per hour. The vapor removed by line 9 contained about 36 parts by weight of water vapor, about 58.5 parts by weight of benzene, about 20 parts by weight of butene-1 and about 9.5 parts by weight of butadiene, i.e. the water of the vapor stream removed by line 9 constituted about 61 mole percent of the vapor stream. The stream in line 14 contained about 11.5 parts by weight of polybutadiene, about 141 parts by weight of water and was calculated to contain about 0.5 parts by weight of benzene, butene-1 and butadiene. The benzene, butene-1 and butadiene are essentially dissolved in the polybutadiene—thus the polybutadiene particles in water leaving the coagulation vessel by line 14 was calculated to contain about 5.8 weight percent of benzene plus butene-1 plus butadiene based on the total of polybutadiene, benzene, butene-1 and butadiene or 5.6 weight percent expressed as the amount of benzene in the polybutadiene based on polybutadiene plus benzene plus butene-1 plus butadiene.

The polymer particles in water were passed by line 16 to the stripper 17 and steam at about 10.5 kg/cm$^2$ and about 250° C. was controllably added at a rate of about 2 parts by weight per hour per 153 parts by weight per hour of water and polymer particles from line 16. The temperature in the stripper was typically about 121° C. and the pressure in the stripper was typically about 2.2 kg/cm² absolute. The vapor was removed by line 19 at a rate of about 3 parts by weight per hour and contained about 2.5 parts by weight of water vapor and about 0.5 parts by weight of benzene, butene-1 and butadiene. The polymer in water left the stripper by line 22 at a rate of about 152 parts by weight per hour and contained about 11.5 parts by weight of polybutadiene plus benzene and about 140.5 parts by weight of water. The concentration of the benzene in the polybutadiene was calculated to be about 0.75 weight percent based on polybutadiene plus benzene.

The polymer in water in line 22 was passed by line 24 into a second stripper 25 and steam was supplied to this stripper by line 29 at a rate of about 2 parts by weight per hour per 152 parts by weight per hour of polymer in water. The steam was at a temperature of about 250° C. and a pressure of about 10.5 kg/cm². The temperature in this stripper was about 111° C. and the pressure was about 1.5 kg/cm² absolute. The vapor was removed by line 27 at a rate of about 5 parts by weight per hour and contained water vapor and essentially all the remaining benzene. The polymer in water was removed from the stripper by line 30 at a rate of about 149 parts by weight per hour and contained about 7.7 weight percent of polybutadiene particles in water. The polybutadiene was calculated to contain about 0.06 weight percent of benzene based on polybutadiene plus benzene. This stream of polymer particles in water was passed to a dewatering extruder-drier extruder combination for the production of dry polybutadiene (not shown).

The control of the operation of the coagulator was as follows. For the equation relating temperature (T), pressure (P) and benzene contained in the polymer (X)

$$T = C_1(P) + C_2(X) + C_3$$

$C_1$ was 11.3, $C_2$ was $-2.8$ and $C_3$ was 98.3. It was desired to operate at a level of 5.6 weight percent of benzene contained in the polybutadiene particles in water in the coagulation vessel and a pressure in the coagulation vessel of 3.5 kg/cm² absolute, giving a temperature aiming point of 122.2° C.—the actual operating temperature was about 121.5° C. Referring to FIG. 1, pressure-transmitter 36 transmits the coagulation vessel pressure to control means 41 and temperature recorder-transmitter 35 transmits the temperature into the coagulation vessel to control means 41. The desired level of benzene contained in the polybutadiene (5.6 weight percent) was entered into control means 41 by line 42. Control means 41 comprised a ratio relay for the pressure and an adding relay for the desired level of residual benzene and provided a calculated temperature which was then compared to the actual temperature and provided a signal to valve 12 for control of the flow of steam into the coagulation vessel to achieve the calculated temperature. The total amount of steam consumed was found to be 5.5 kg per kg of polybutadiene.

EXAMPLE 2

This is a comparative example illustrating the recovery of the polybutadiene of Example 1 using a prior art process with the process layout of FIG. 1 but omitting the inter-related control of the temperature, pressure and residual benzene in polybutadiene of the present invention. The steam flow in line 3 was about 42 parts by weight per hour per 100 parts by weight per hour of polybutadiene solution and the steam flow in line 11 was about 24 parts by weight per hour per 100 parts by weight per hour of polybutadiene solution in line 1. The temperature in coagulation vessel 7 was 127° C. and the pressure was about 4 kg/cm² absolute. The polybutadiene particles in water in the coagulation vessel were calculated to contain only about 2 weight percent of residual benzene based on polybutadiene plus benzene plus butene-1 plus butadiene. The steam flows to stripper 17 by line 21 and to stripper 25 by line 29 were both about 2.5 parts by weight per 100 parts by weight per hour of polybutadiene solution in line 1. The temperature and pressure in stripper 17 were about 125° C. and about 3.7 kg/cm² absolute and in stripper 25 were about 118° C. and about 2.9 kg/cm² absolute. The total steam consumption was found to be about 6 kg of steam per kg of polybutadiene recovered.

EXAMPLE 3

Using a process as shown in FIG. 2, chlorinated butyl, which is a chlorinated isobutylene-isoprene copolymer, was recovered from a solution thereof in hexane. The chlorinated butyl was produced by the reaction of chlorine with a solution of butyl rubber in hexane. The chlorinated butyl solution at a temperature of about 55° C. was fed into line 101 at a rate of 100 parts by weight per hour and contained about 13.3 parts by weight of chlorinated butyl per 100 parts by weight of solution. Water at a temperature of about 80° C. was added to the solution by line 102 at a rate of about 71 parts by weight per hour. Steam was added through line 103 at a rate of about 4.9 parts by weight, the steam being at a pressure of about 10.5 kg/cm² and a temperature of about 197° C. The chlorinated butyl solution, water and steam were mixed in eductor 104 and passed by line 105 into the coagulation vessel 106. Water at a temperature of about 80° C. was added to the coagulation vessel by line 113 at a rate of about 112.5 parts by weight per hour. Steam was added to the coagulation vessel by line 110 at a rate of about 44 parts by weight per hour, the steam being at a pressure of about 10.5 kg/cm² and a temperature of about 197° C., thereby maintaining the temperature in the coagulation vessel at about 113° C. at the desired pressure of about 2.55 kg/cm² absolute. Vapor was removed from the coagulation vessel by line 108 and polymer particles in water were removed from the coagulation vessel by line 114. The vapor in line 108 contained about 38 mole percent of hexane—i.e. the water constituted about 62 mole percent of the vapor stream. The polymer particles in water in line 114 contained about 4 weight percent of residual hexane based on polymer plus hexane. The polymer particles in water in line 114 were transferred by pump 115 and line 116 to stripper 117. No steam was added to the stripper by line 121. The stripper was at a temperature of about 101° C. and at a pressure of about 1.12 kg/cm² absolute. Vapor was removed from the stripper through line 119 and polymer particles in water were removed by line 122. The polymer particles in line 122 contained, by calculation, from about 0.01 to about 0.1 weight percent of hexane based on polymer plus hexane. This stream of polymer particles in water was passed to a dewatering extruder-drier extruder combination for the production of dry chlorinated butyl (not shown).

Control of the operation of the coagulation vessel was achieved by control of the temperature (T), and pressure (P) in the coagulation vessel and of the residual hexane (X) contained in the polymer in the coagulation vessel.

This control was exercised through control means 132 by use of the equation $$T = C_1(P) + C_2(X) + C_3$$

in which the value of the constants was $C_1 = 13$, $C_2 = 3$ and $C_3 = 91.5$.

Setting the aiming point for hexane contained in the polymer (X) as 4 weight percent and the pressure in the coagulation vessel at 2.55 kg/cm² absolute, the operating temperature was calculated to be about 112.5° C., to be compared with the actual operating temperature of 113° C. The control was exercised operationally by, with reference to FIG. 2, entering the aiming point for hexane contained in the polymer (4 wt. %) into control means 132 and providing the pressure in the coagulator from pressure-transmitter 128. The temperature in the coagulator was supplied by temperature recorder-transmitter 126 and compared with the calculated temperature in control means 132 which then provided a signal to valve 111 to control the flow of steam to the coagulator by line 110. Steam consumption for the recovery of the chlorinated butyl was about 3.7 kg of steam per kg of chlorinated butyl.

What is claimed is:

1. An improved continuous process for the recovery of an elastomeric polymer from a solution thereof in organic solvent, which process comprises contacting in a coagulation vessel operated at a pressure greater than atmospheric the solution of the polymer with water and steam to produce a first overhead stream of vaporized solvent and water and a first bottom stream of water and polymer particles containing residual solvent, passing said first overhead stream to a condensing means for condensing said vaporized solvent and water to the liquid phase, passing said first bottom stream to at least one but not more than three stripping vessels in series, said stripping vessels being maintained at a lower pressure than in said coagulation vessel but above atmospheric pressure, to produce a second overhead stream of vaporized solvent and water and a second bottom stream of polymer particles in water, passing said second overhead stream of vaporized solvent and water to a condensing means for condensing said vaporized solvent and water to the liquid phase, passing said second bottom stream of polymer particles in water to separating means and separating said polymer particles from the water and drying said separated polymer particles, the improvement being that the temperature and pressure in said coagulation vessel are inter-relatedly varied such that the first overhead vapor stream from said coagulation vessel contains not more than about 50 mole percent of said organic solvent and that the polymer particles in water of the first bottom stream contain a predetermined amount of residual solvent which is greater than about 3 but not greater than about 8 percent by weight based on polymer plus solvent, in accordance with the equation $$T = C_1(P) + C_2(X) + C_3$$

where

T is the temperature in °C. in the coagulation vessel,

P is the absolute pressure in kg/cm² in the coagulation vessel, and

X is the weight percent of solvent remaining in the polymer particles of the first bottom stream, and $C_1$, $C_2$ and $C_3$ are empirical constants for the process, said coagulation vessel being operated at a temperature of from about 105° to about 125° C. and a pressure of from about 2.1 to about 3.5 kg/cm² absolute.

2. The process of claim 1 wherein the amount of residual solvent in the polymer particles of the first bottom stream is from about 4 but not more than about 6 weight percent based on polymer plus solvent.

3. The process of claim 1 wherein the stripping vessel or vessels is operated at a temperature greater than about 100° C. but below the temperature of the coagulation vessel and at a pressure above 1 kg/cm² absolute but below the pressure of the coagulation vessel.

4. The process of claim 1 wherein the solution in organic solvent of the elastomeric polymer contains unreacted monomer.

5. The process of claim 1 wherein the solution of polymer supplied to the coagulation vessel contains mixed therewith water having a temperature of from about 40° to about 90° C.

6. The process of claim 1 wherein a further supply of steam is added to any one or more of said stripping vessels.

* * * * *